Oct. 30, 1956     W. R. BERTELSEN     2,768,545
AUTOMATIC TIRE CHAIN APPLIER AND HOLDER
Filed Nov. 29, 1952                               7 Sheets-Sheet 3
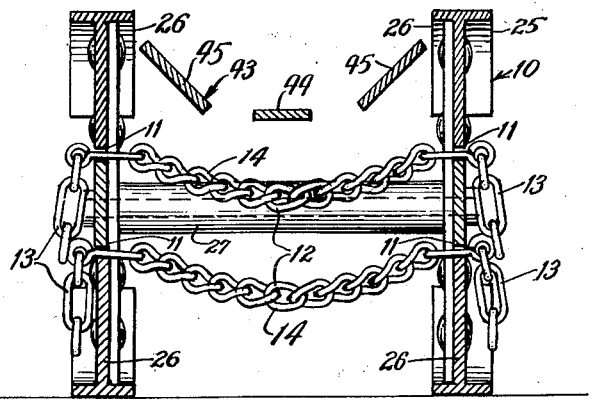
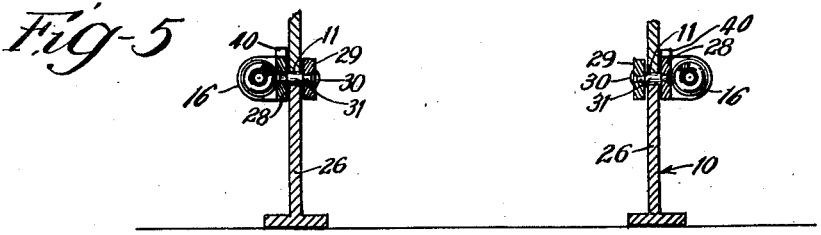
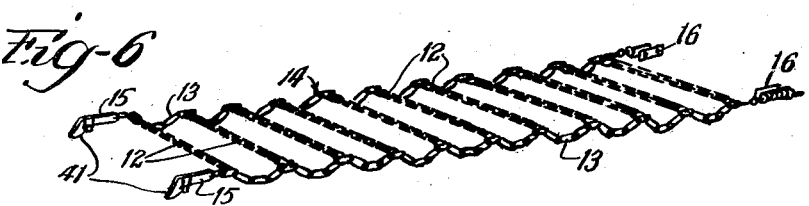
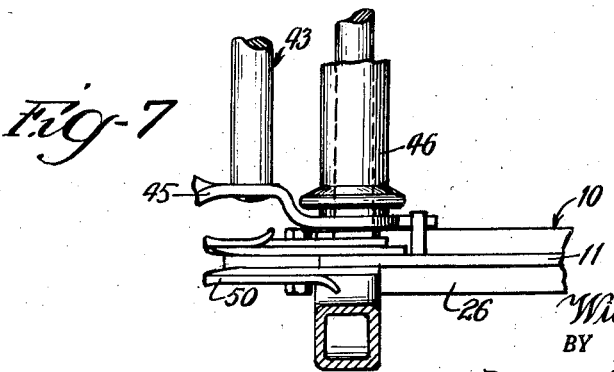
INVENTOR.
William R. Bertelsen
BY
Mann, Brown, and Hansman
Attys.

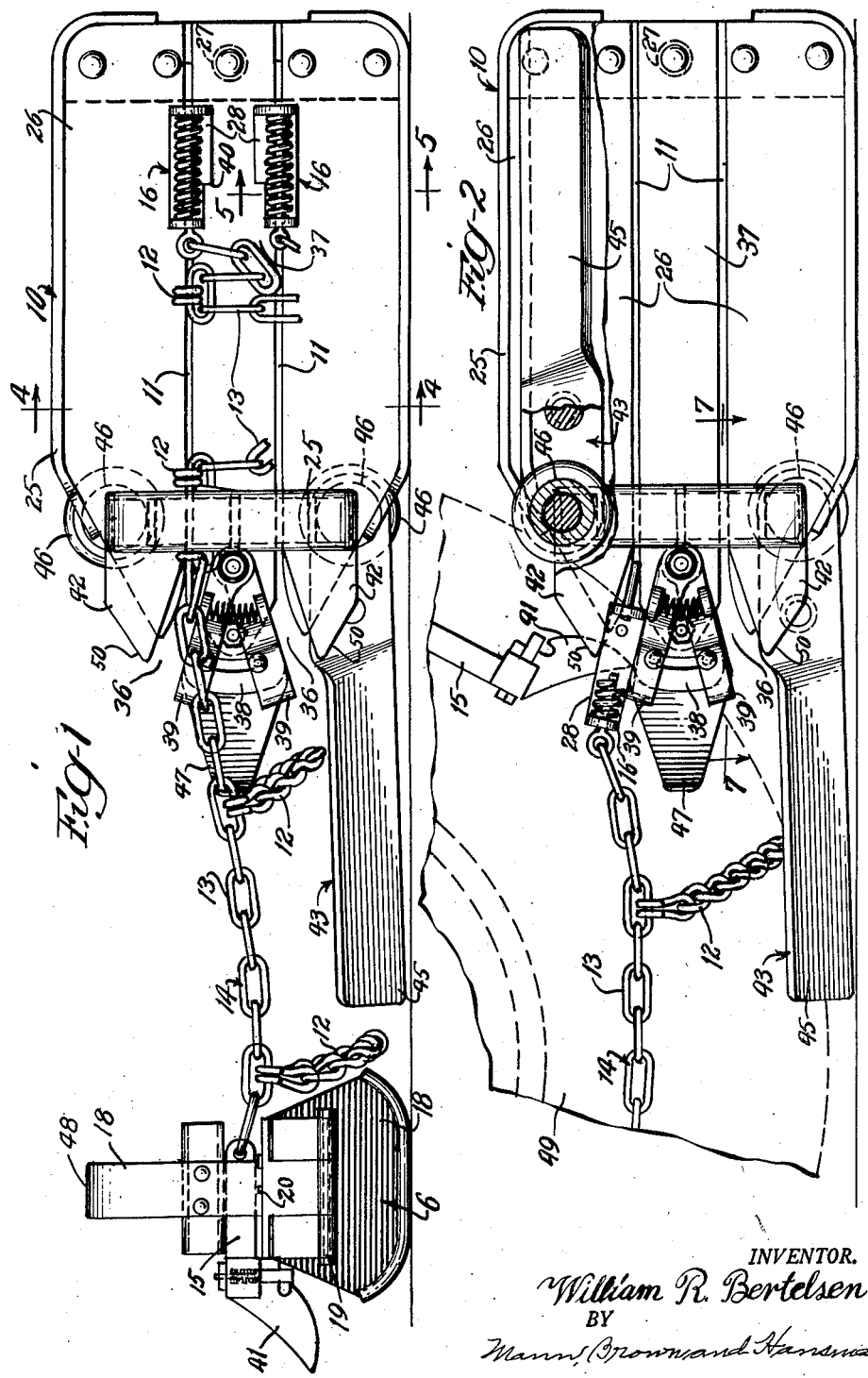

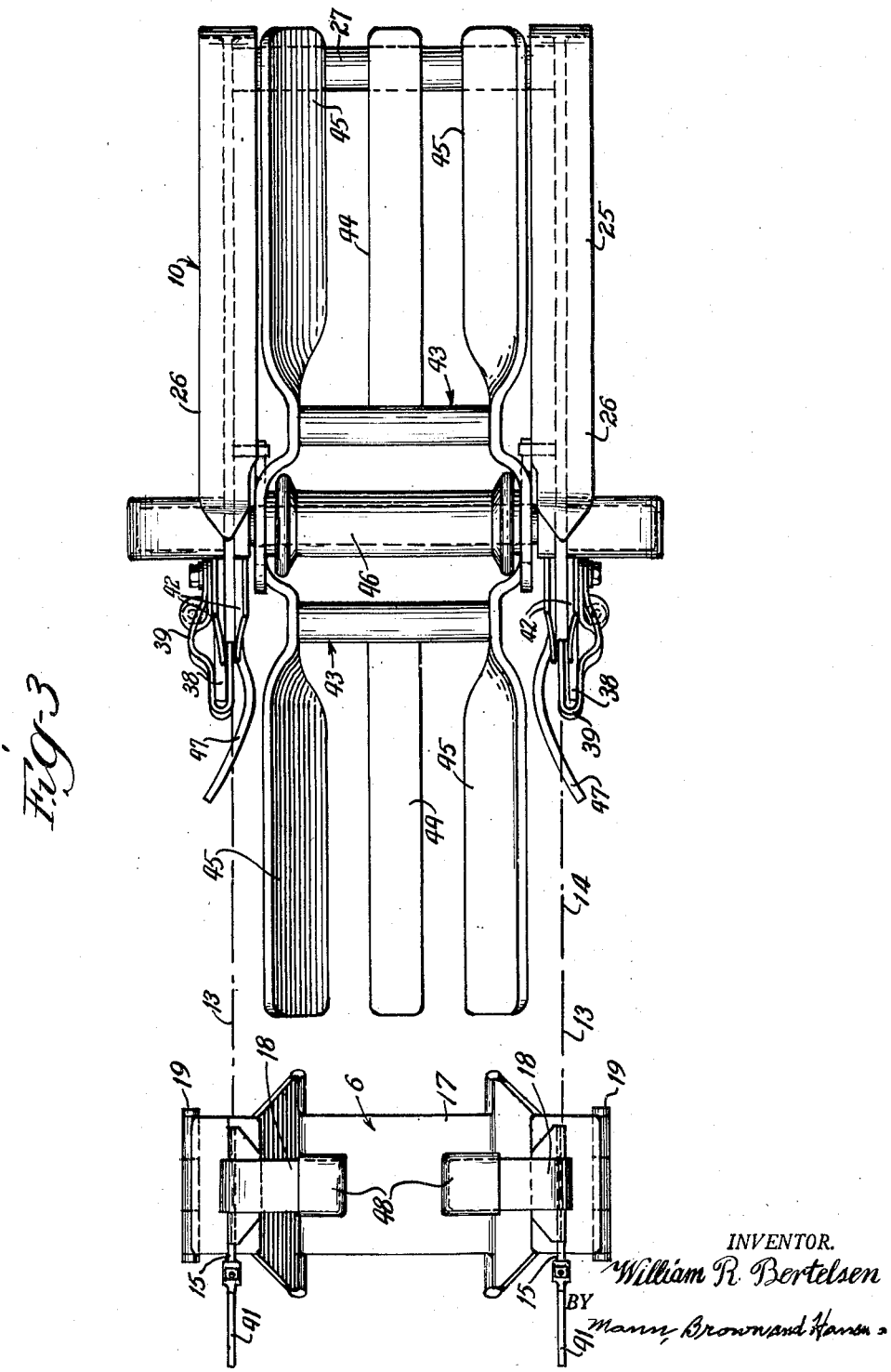

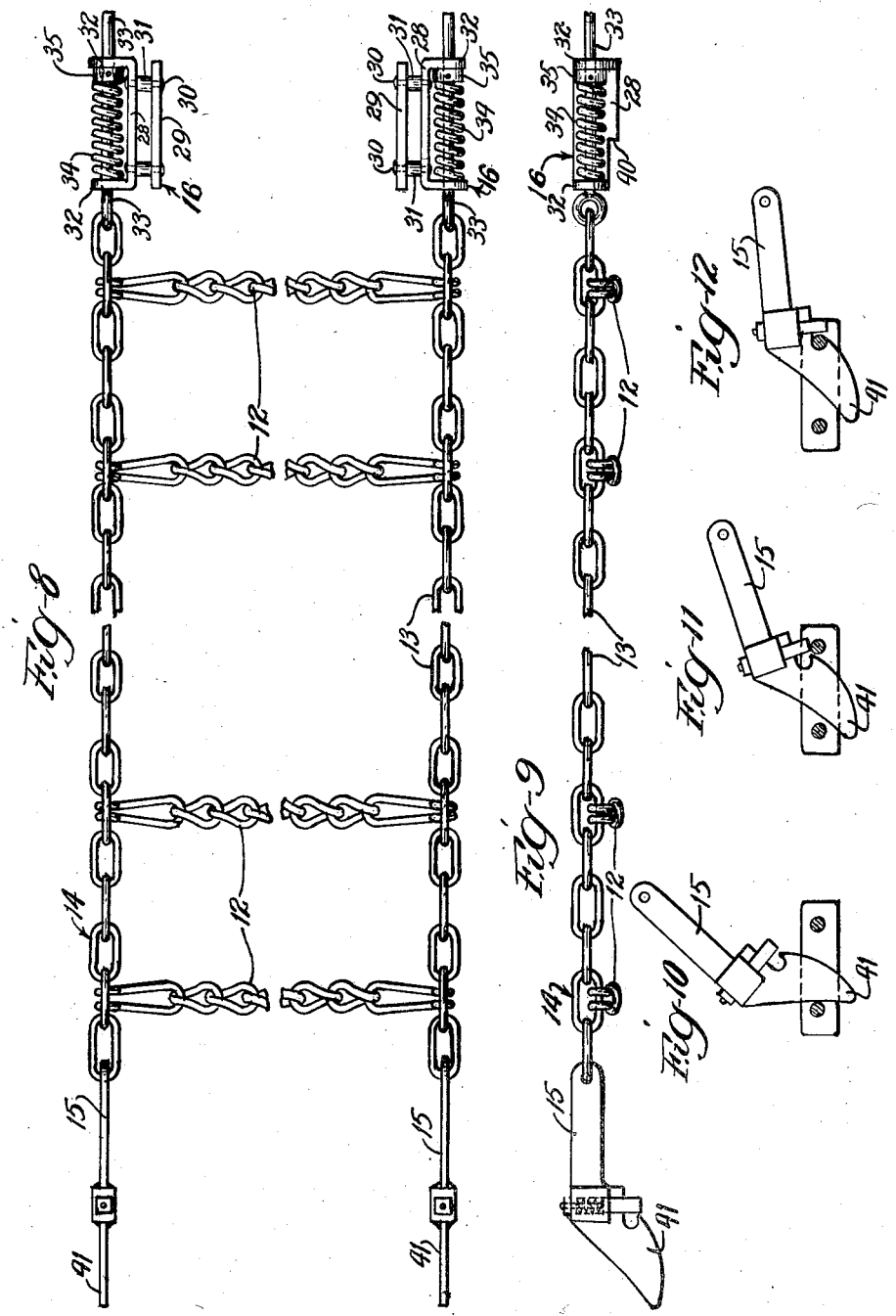

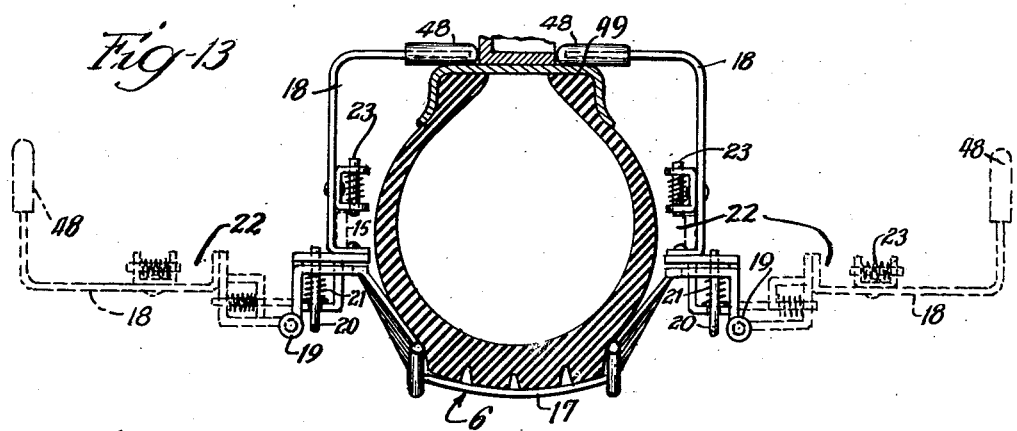
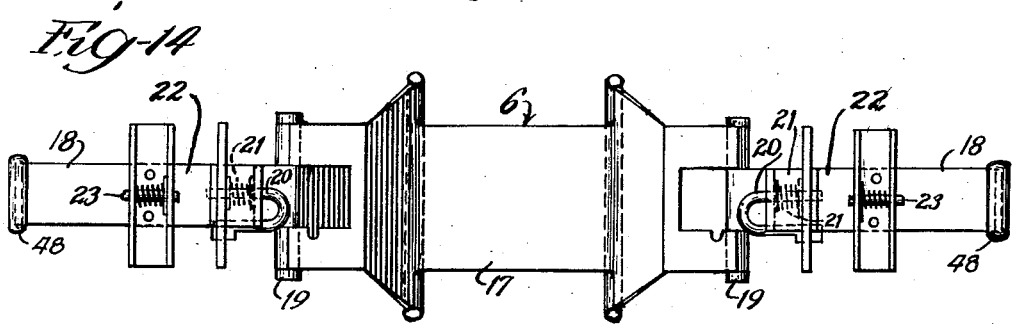
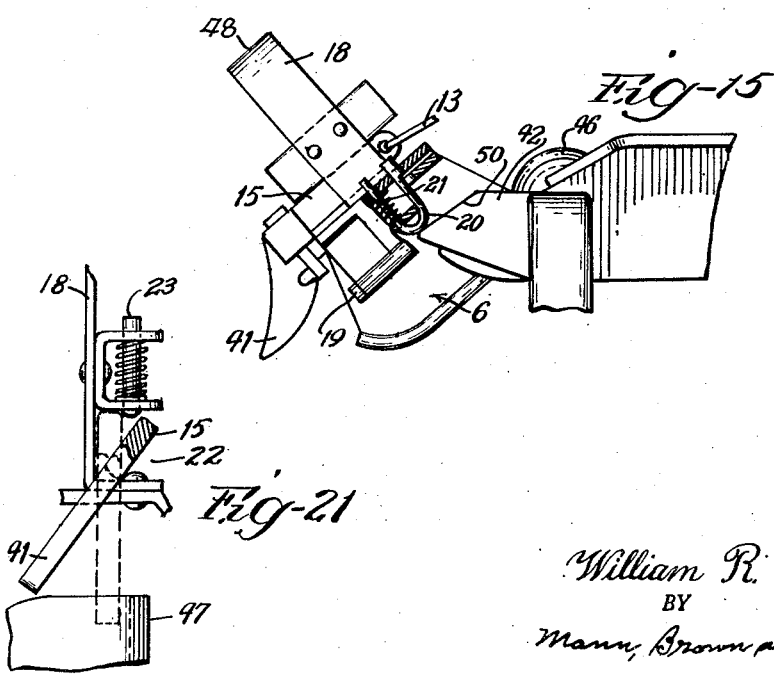

Oct. 30, 1956 W. R. BERTELSEN 2,768,545
AUTOMATIC TIRE CHAIN APPLIER AND HOLDER
Filed Nov. 29, 1952 7 Sheets-Sheet 6
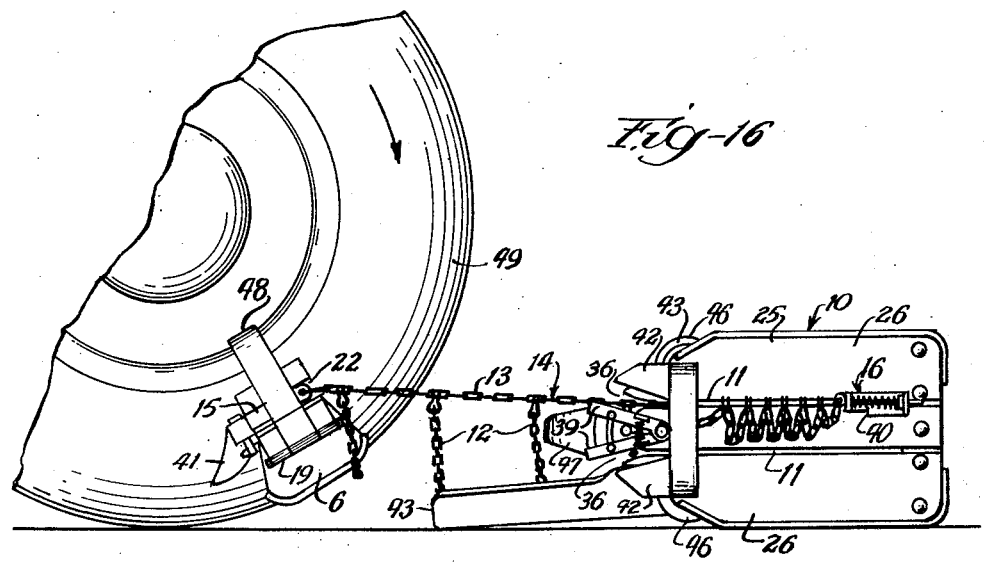
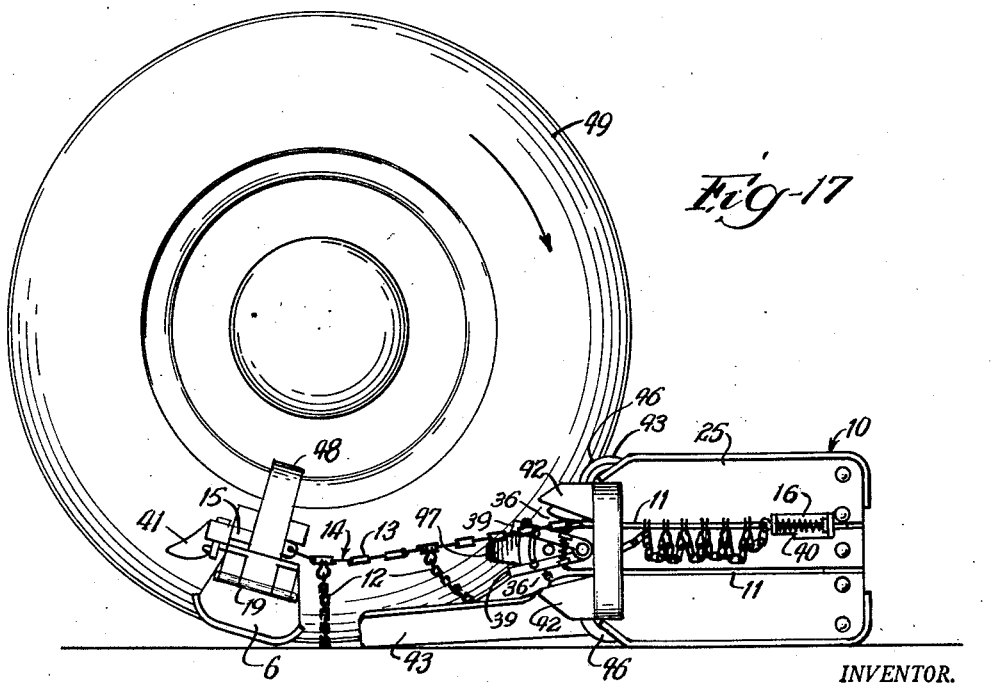
INVENTOR.
William R. Bertelsen
BY
Mann, Brown and Hansmann
Attys.

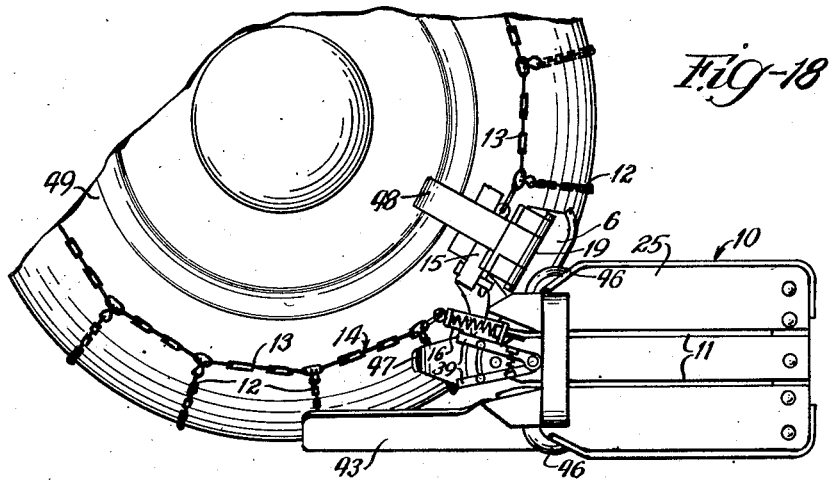
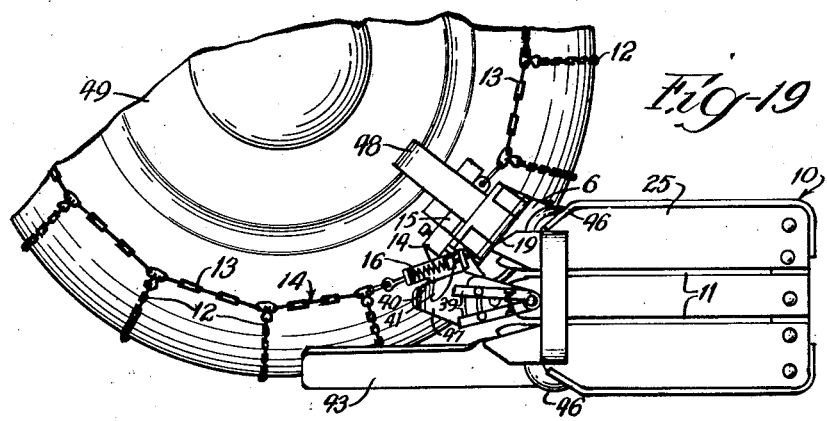
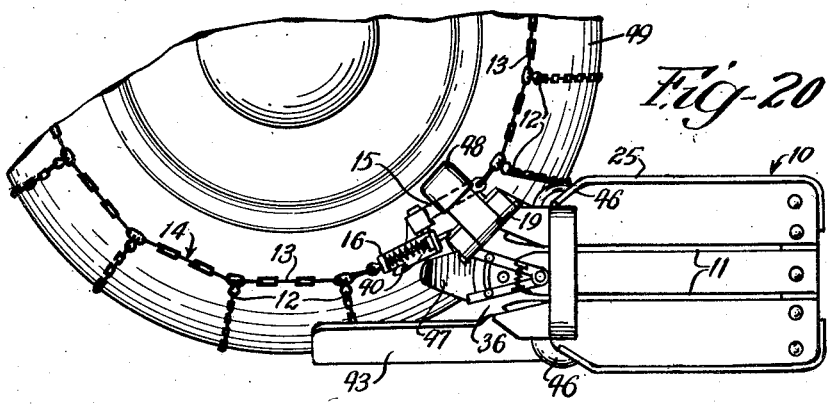

United States Patent Office 2,768,545
Patented Oct. 30, 1956

2,768,545

AUTOMATIC TIRE CHAIN APPLIER AND HOLDER

William R. Bertelsen, Neponset, Ill.

Application November 29, 1952, Serial No. 323,264

9 Claims. (Cl. 81—15.8)

This invention relates to the application of traction chains to vehicle tires, and has for its principal object to provide means and methods by which traction chains can be applied properly and quickly with a minimum of physical labor.

Generally speaking, this is accomplished by stacking the chain in a holder including spaced side pieces having open ended slots adapted to receive the cross links adjacent to the side chains folded outside of the side pieces; fastening the latches at the end of the side chains to each side of a tire; paying the chain out of the guides and wrapping it on the tire by rotating the tire; holding the catches at the opposite ends of the side chains in position to receive the travelling latches; and guiding the latches into engagement with the catches.

Further objects and advantages of the invention will appear as the disclosure proceeds and the description is read in connection with the accompanying drawings, in which:

Fig. 1 is a side elevation of the chain holder, tire clamp, and a traction chain in a preliminary position;

Fig. 2 is a similar side elevation of the chain holder with parts broken away to show how the latch at one end of the chain enters the catch at the other end of the chain as the wheel rotates toward the end of the operation;

Fig. 3 is a plan view of Fig. 1;

Fig. 4 is a vertical cross section on the line 4—4 of Fig. 1;

Fig. 5 is a vertical cross section on the line 5—5 of Fig. 1 through a portion of the chain holder and the catch at the inner end of the chain;

Fig. 6 is a diagrammatic view of the chain partially extended from the stored position;

Fig. 7 is a fragmentary section on the line 7—7 of Fig. 2 showing the channel in the chain holder and the trip for the hinged arm of the chain holding clamp;

Fig. 8 is a plan view of the chain with the latch at one end and the catch at the other;

Fig. 9 is a side elevation of the same;

Fig. 10 is a side elevation of the latch entering the catch;

Fig. 11 is a similar view with the latch further entered and the pawl being raised;

Fig. 12 is a similar side elevation showing the latch and the catch fastened together as they are when the chain is on the wheel;

Fig. 13 is a front elevation of the clamp for gripping the tire and holding the leading end of the chain, the side arms being shown closed on the tire in solid lines and swung outwardly in dotted lines;

Fig. 14 is a plan view of the clamp with the arms in the dotted line position shown in Fig. 13;

Fig. 15 is a detail showing the parts in the position they assume as the fastening means for the arms of the clamp are tripped to permit them to swing from the solid line position in Fig. 13 is the dotted line position in that figure;

Fig. 16 is a diagrammatic representation of the device with the chain holder laid on the ground adjacent to a wheel, the latch ends of the chain fastened to the clamp, and the clamp on the tire preparatory to starting the chain winding operation;

Fig. 17 is a view similar to Fig. 16 at the start of the revolution of the wheel for applying the chain;

Fig. 18 is a similar view showing the parts as the clamp approaches the end of the revolution and enters the latch at the leading end into the catch at the opposite end of the chain;

Fig. 19 is a similar view with the latch approaching the fastened position shown separately in Fig. 12;

Fig. 20 is a view similar to Fig. 19 with the parts approaching the position in which the trips on the chain holder release the fastening for the hinged arms of the clamp; and Fig. 21, Sheet 5, is a fragmentary sketch showing the latch being freed from the clamp.

But these drawings and the corresponding description are used for the purpose of illustrative disclosure only, and are not intended to impose unnecessary limitations on the claims.

General description

In Fig. 1, there is a chain holder generally indicated by 10 having guide slots 11 adapted to receive cross links 12 adjacent to the side chains 13. The traction chains including cross links and side chains may be of any familiar form, but the ends of the side chains must be provided with latches and catches adapted to make the chains fast around the tire. As here shown, the leading end of the chain generally indicated by 14 is provided with latches 15 adapted to be received in and cooperate with catches generally indicated by 16 as the chain is wrapped around the tire and fastened into position.

The clamp generally indicated by 6 is a somewhat U-shaped frame (Fig. 13) having a body portion 17 and side arms 18, the latter hinged at 19 to swing from the dotted line position to the solid line position shown in Fig. 13, in which latter they are held by U-shaped pawls 20 urged to fastened position by springs 21.

The side arms 18 of the clamp are provided with latch receiving pockets 22 and spring pressed pawls 23 for holding the chain latches 15 as shown at the left in Fig. 1.

With the parts in the position shown in Fig. 16, the tire 24 is rotated in the direction of the arrow and takes the position shown in Fig. 17, where it begins to spin and, continuing, passes through the positions shown in Figs. 18, 19, and 20, in which the chain is completely wrapped onto the tire; the latch 15 enters into the fastened position shown in Fig. 12, where it is held by a pawl or the like; and the arms of the clamp 6 are released, as indicated in Fig. 15, to take the dotted line position shown in Fig. 13.

As here shown, there are two chain guide slots 11 in each side plate 26 of the chain holder 10, two stops 39, and two guide flanges 42 to the end that two chains may be stored in the holder and in application the upper chain is applied to the first wheel. To apply the second chain to the second wheel, the entire chain holder is turned upside down. The device is symmetrical in this respect and functions in an identical manner in either position.

Specific description

The chain holder 10 (Figs. 1, 2, and 3) includes a generally rectangular frame 25, spaced parallel side pieces 26, and a cross piece 27 (Fig. 3) at the right end of the side pieces 26.

The chain receiving slots 11 are in the web of the side pieces 26, which are of a thickness to lie between the plates 28 and 29 (Fig. 8), which together with the pins 30 and spacers 31 form the catches 16 at the right end of the chains. The plate 28 is provided with angles 32 having openings for the shank of a hook 33 biased by a spring 34 bearing against a collar 35 in order to provide a small amount of yield to accommodate variations in sizes of tires and wear.

The guide slots 11 are flared near their open ends, as indicated at 36 (Figs. 1, 2, and 16–20). The intermediate portion 37 of each side plate 26 is provided with a forwardly projecting guide 38 (Fig. 3) to which are pivoted U-shaped stops 39 spring pressed to the position shown in Figs. 1 and 2 to receive the shoulder portion 40 of the catch 16 and hold it in position to receive the angular end 41 of the chain latch 15.

Above the open end of the flared slots 11, there are wing guides 42 to guide the end 41 of the chain latch into the catch 16 while it is held by the pivoted stop 39.

The chain holder is provided with a swinging skid frame generally indicated by 43 (Figs. 1, 2, and 3) having a middle arm 44 and guide arms 45 forming a skid for the tire as it moves from the position shown in Fig. 17 through the position shown in Figs. 18, 19, and 20; and there is an anti-friction roller 46 against which the tire runs during that movement. The tire skids over the arms 44 and 45 and during this movement the frame is maintained aligned relative to the tire by the guide arms 45.

The side pieces 26 of the chain holder have extended guides 47 curving outwardly as shown in Fig. 3 to be engaged by the angular portions 41 of the latches 15 and freed from the arms of the clamp 6 (see Fig. 21).

The arms 18 of the clamp 6 are provided with cushioned fingers 48 adapted to fit the wheel 49 as indicated in Fig. 13, when the clamp is in position to hold the leading end of the chain.

The general operation is sufficiently stated in the general description.

To make the chain ready for use, the chain holder 10 is stood on end so that the right end of the holder as viewed in Fig. 1 rests on the ground and the chain inserted with the cross links in the guide slots forming a stack and the side chains folded outside of the side plates 26, the catches 16 being in the bottom of the guide slots 11 with the holder in upright position.

When a chain is to be applied, the holder with the chain is laid in the position shown in Fig. 16. The clamp with the latches 15 fitted into the pockets 22 (by rotation sidewise) and held by the pawls 23 is placed against the tire approximately in the location shown in Fig. 16. In applying the clamp 6 the inside arm 18 which engages the inside wall of the tire is in the full line position shown in Fig. 13 and the outside arm 18 is in the dotted line position shown in Fig. 13. The outside arm is then swung to the solid line position, which fastens the clamp to the wheel, and the leading end of the chain is in position for the applying operation. The wheel is then rotated in the direction of the arrow shown in Figs. 16 and 17, and the parts pass through the positions shown in Figs. 17, 18, 19, and 20. The skid frames 43 and rollers 46 keep the tire centered in the frame 25 so that the latch and catch come together in proper alignment.

In Fig. 18, the latches 15 are in position to enter the catches 16, strike the U-shaped stops 39 and push them from the position shown in Fig. 18 to that shown in Fig. 19. At the same time, the latch enters the catch and approaches the fastened position shown in Fig. 12, having passed through the position shown in Figs. 10 and 11. In this operation, the leading end of the latch 15 is directed by the guides 42, and the catches are supported by the projecting guide 38 and the curved guides 47.

As the parts pass through the position shown in Fig. 20, the trips 50 (Figs. 7 and 15) raise the U-shaped pawls 20 and unfasten the hinged arms 18 of the clamp; and the flared guides 47 throw the latches 15 free of the pawls 23 (Fig. 21, Sheet 5), and the chain applying operation is completed.

Description of much detail shown in the drawings is omitted to avoid prolixity and because variations in mechanical feature are contemplated.

I claim:

1. In a device for applying traction chains to wheels, a chain holder including spaced side pieces having open ended guide slots adapted to receive cross links adjacent to the side chains folded outside of the side pieces, a clamp adapted to grip a tire to which a traction chain is to be applied, chain latch connecting means on said clamp adapted to fasten and hold latches on one end of the side chain, and stop means movably secured on said side pieces adjacent to the open ends of said slots, resilient means on each side piece urging said stop means into operative engagement to hold catches on the other end of the side chains in position to receive said latches upon revolution of said clamp with a tire to which the traction chains are to be applied.

2. In a device for applying traction chains to wheels, a chain holder including spaced side pieces having open ended guide slots adapted to receive cross links adjacent to the side chains folded outside of the side pieces, a clamp adapted to grip a tire to which a traction chain is to be applied, chain latch connecting means on said clamp adapted to fasten and hold latches on one end of the side chain, stop means movably secured on said side pieces adjacent to the open ends of said slots, resilient means on each side piece urging said stop means into operative engagement to hold catches on the other end of the side chains in position to receive said latches upon revolution of said clamp with a tire to which the traction chains are to be applied, and guides on said side pieces adapted to direct said latches into said catches.

3. In a device for applying traction chains to wheels, a chain holder including spaced side pieces having parallel open ended slots adapted to receive cross links of a traction chain stacked one upon the other with the side chains in loops outside of the side pieces, a tire engaging roller between the side pieces above the slots, skid means projecting from the side pieces for engagement with the tire below the slots, said skid means having tire engaging surfaces for aligning the chain holder relative to the tire, stop means on each side piece below the open end of each slot adapted to hold catches on one end of side chains of a traction chain, and guides on each side piece above the open end of the slots adapted to direct latches on the opposite end of the side chains into catches held by said stop means.

4. In a device for applying traction chains to wheels, a chain holder including spaced side pieces having open ended guide slots adapted to receive cross links adjacent to the side chains folded outside of the side pieces, said slots being open at one end and flared, a clamp adapted to grip a tire to which a traction chain is to be applied, chain latch connecting means on said clamp adapted to fasten and hold latches on one end of the side chain, stop means pivotally secured on each side piece below the flared open end of each slot, resilient means urging said stop means upwardly to hold yieldably extensible catches on one end of side chains of a traction chain, and guides on each side piece above the open end of the slots adapted to direct latches on the opposite end of the side chains into catches held by said stop means.

5. In a device for applying traction chains to wheels, a chain holder including a frame and spaced side pieces secured to the frame and having parallel open ended slots adapted to receive cross links of a traction chain stacked one upon the other with the side chains in loops outside of the side pieces, stop means pivotally secured on each side piece below the open end of each slot, resilient means on each side piece urging said stop means upwardly to hold catches on one end of side chains of a traction chain, and guides rigidly secured on each side piece above the open end of the slots adapted to direct latches on the opposite end of the side chains into catches held by said stop means.

6. In a device for applying traction chains to wheels, a chain holder including spaced side pieces having parallel open ended slots adapted to receive cross links of a traction chain stacked one upon the other with the side chains in loops alongside of the side pieces, wheel guides projecting from the side pieces for engagement with the tire below the slots for aligning the chain holder relative to the tire, and anti-friction means above the slots.

7. In a device for applying traction chains to wheels, a chain holder including spaced side pieces having parallel open ended slots adapted to receive cross links of a traction chain stacked one upon the other with the side chains alongside of the side pieces, stop means movably secured on each side piece below the open end of each slot, resilient means on each side piece urging said stop means upwardly to hold catches on one end of side chains of a traction chain, and guide means rigidly carried on each side piece above the open end of each slot adapted to direct latches on the opposite end of the side chains into catches held by said stop means.

8. In a device for applying traction chains to wheels, a chain holder including spaced side pieces having open ended guide slots adapted to receive cross links adjacent to the side chains folded outside of the side pieces, a releasable clamp adapted to grip a tire to which a traction chain is to be applied, releasable chain latch connecting means on said clamp adapted to fasten and hold latches on one end of the side chain, stop means on said side pieces adjacent to the open ends of said slots adapted to hold catches on the other end of the side chains in position to receive said latches upon revolution of said clamp with a tire to which the traction chains are to be applied, and trip means carried by said side pieces for releasing said chain latch connecting means from said latches and for releasing said clamp from said tire.

9. In a device for applying traction chains to wheels, a chain holder including spaced side pieces having parallel open ended slots adapted to receive cross links of a traction chain stacked one upon the other with the side chains along side of the side pieces, stop means movably secured on said side pieces adjacent to the open ends of said slots, resilient means on each side piece urging said stop means into operative engagement to hold catches on one end of the side chains of a traction chain, and guide means rigidly mounted on said side pieces and adapted to direct latches on the opposite end of the side chains into said catches.

References Cited in the file of this patent

UNITED STATES PATENTS

| | | |
|---|---|---|
| 1,346,469 | Schneider | July 13, 1920 |
| 1,540,644 | Mamaux | June 2, 1925 |
| 1,630,111 | Cronenweth | May 24, 1927 |
| 2,068,207 | Torbert | Jan. 19, 1937 |
| 2,608,117 | Gonyea | Aug. 26, 1952 |
| 2,613,563 | Shapiro | Oct. 14, 1952 |
| 2,619,857 | McKenna | Dec. 2, 1952 |